(12) United States Patent
Pettersen et al.

(10) Patent No.: US 11,805,763 B2
(45) Date of Patent: Nov. 7, 2023

(54) EFFICIENT LAND-BASED FISH FARM

(71) Applicant: Andfjord Salmon AS, Sortland (NO)

(72) Inventors: Roy Bernt Pettersen, Sortland (NO);
Ben Tommy Eriksen, Straumsjøen (NO)

(73) Assignee: Andfjord Salmon AS, Sortland (NO)

( * ) Notice: Subject to any disclaimer, the term of this patent is extended or adjusted under 35 U.S.C. 154(b) by 367 days.

(21) Appl. No.: 16/384,312

(22) Filed: Apr. 15, 2019

(65) Prior Publication Data

US 2019/0313612 A1    Oct. 17, 2019

Related U.S. Application Data

(60) Provisional application No. 62/657,582, filed on Apr. 13, 2018.

(51) Int. Cl.
*A01K 63/04* (2006.01)
*A01K 61/10* (2017.01)

(52) U.S. Cl.
CPC ............ *A01K 63/045* (2013.01); *A01K 61/10* (2017.01)

(58) Field of Classification Search
CPC ........ A01K 61/10; A01K 61/70; A01K 63/00; A01K 63/04; A01K 63/045; A01K 63/047
USPC .................. 119/226, 227, 228, 247
See application file for complete search history.

(56) References Cited

U.S. PATENT DOCUMENTS

| | | | |
|---|---|---|---|
| 3,916,834 A | 11/1975 | Buss | |
| 4,221,187 A * | 9/1980 | Casey | A01K 61/10 119/232 |
| 4,399,769 A * | 8/1983 | Casey | A01K 61/80 119/232 |
| 4,669,420 A * | 6/1987 | Swanson | A01K 61/10 119/226 |
| 4,911,849 A * | 3/1990 | Labesque | C12M 23/18 405/74 |
| 5,353,745 A | 10/1994 | Fahs, II | |
| 5,425,723 A * | 6/1995 | Wang | A61M 25/007 138/114 |
| 5,450,818 A * | 9/1995 | Caillouet | A01K 63/04 119/223 |
| 5,535,702 A * | 7/1996 | Idbeis | A01K 63/006 119/247 |

(Continued)

FOREIGN PATENT DOCUMENTS

| | | | | |
|---|---|---|---|---|
| CN | 201188820 | * | 2/2009 | ............ A01K 63/00 |
| CN | 201188820 Y | | 2/2009 | |

(Continued)

OTHER PUBLICATIONS

International Patent Application No. PCT/IB2019/053091; Int'l Search Report and Written Opinion; dated Sep. 27, 2019; 14 pages.

(Continued)

*Primary Examiner* — Tien Q Dinh
*Assistant Examiner* — Kevin M Dennis
(74) *Attorney, Agent, or Firm* — BakerHostetler (57) ABSTRACT

Efficient fish farming techniques are described, including a land-based saltwater flow-through pool fed by seawater intakes, and efficient water flow and waste removal techniques that promote good fish growing conditions. Features include devices for encouraging laminar flow in the flow-through pool, and efficient waste removal, and multiple seawater intakes from different ocean depths.

6 Claims, 13 Drawing Sheets

(56) References Cited

U.S. PATENT DOCUMENTS

| | | | | |
|---|---|---|---|---|
| 5,636,595 A | * | 6/1997 | Lunde | A01K 63/10 119/224 |
| 5,732,657 A | * | 3/1998 | Idbeis | A01K 63/006 119/257 |
| 5,860,393 A | * | 1/1999 | Calabrese, Jr. | A01K 63/04 119/260 |
| 6,244,219 B1 | * | 6/2001 | Krum | A01K 63/04 119/231 |
| 6,641,732 B1 | * | 11/2003 | Cheyne | A01K 63/00 210/615 |
| 7,690,330 B2 | * | 4/2010 | Miller | A01K 63/10 119/228 |
| 7,717,065 B2 | * | 5/2010 | McRobert | A01K 61/60 119/226 |
| 7,731,841 B1 | * | 6/2010 | Tennyson, Jr. | A01K 63/00 210/151 |
| 8,707,988 B2 | * | 4/2014 | Glomset | A01K 63/00 137/561 A |
| 8,813,685 B2 | * | 8/2014 | Vento | A01K 63/02 119/226 |
| 9,717,219 B2 | * | 8/2017 | Glomset | A01K 63/042 |
| 10,246,355 B2 | * | 4/2019 | Jung | A01K 61/00 |
| 10,405,506 B2 | * | 9/2019 | Lovas | A01K 63/047 |
| 2003/0116489 A1 | * | 6/2003 | Terato | A01K 63/045 210/167.21 |
| 2005/0029178 A1 | * | 2/2005 | Haddas | A01K 63/04 210/167.26 |
| 2005/0120970 A1 | * | 6/2005 | Massingill | A01K 63/00 119/216 |
| 2008/0173249 A1 | * | 7/2008 | Miller | A01K 63/00 119/228 |
| 2009/0038556 A1 | * | 2/2009 | Ouchi | A01K 63/047 119/207 |
| 2010/0200069 A1 | * | 8/2010 | Glomset | A01K 63/042 137/1 |
| 2014/0216558 A1 | * | 8/2014 | Glomset | A01K 61/00 137/1 |
| 2015/0334997 A1 | | 11/2015 | Kuhn et al. | |
| 2017/0118963 A1 | * | 5/2017 | Higashi | A01K 63/04 |
| 2017/0118964 A1 | * | 5/2017 | Tsai | A01G 31/02 |
| 2017/0215391 A1 | * | 8/2017 | Gervais | B01F 3/04262 |
| 2018/0271041 A1 | * | 9/2018 | Lovas | A01G 31/02 |
| 2020/0000052 A1 | * | 1/2020 | Lovas | A01G 31/02 |
| 2021/0161108 A1 | * | 6/2021 | Haaland | A01K 63/00 |
| 2021/0206457 A1 | * | 7/2021 | Kyrkjebo | B63B 35/00 |
| 2021/0227808 A1 | * | 7/2021 | Liu | A01K 61/17 |

FOREIGN PATENT DOCUMENTS

| | | |
|---|---|---|
| CN | 202276727 U | 6/2012 |
| CN | 107500411 A | 12/2017 |
| EP | 2773190 A1 | 9/2014 |
| GB | 1592085 A | 7/1981 |
| NO | 179961 B | 10/1996 |
| WO | WO 2001/032562 A1 | 5/2001 |
| WO | WO 2004/093534 A1 | 11/2004 |
| WO | WO 2013/066188 A1 | 5/2013 |

OTHER PUBLICATIONS

International Patent Application No. PCT/IB2019/053091; Int'l Preliminary Report on Patentability; dated Mar. 25, 2020; 16 pages.
European Patent Application No. 21183746.3; Extended Search Report; dated Oct. 1, 2021; 13 pages.

* cited by examiner

EFFICIENT LAND-BASED FISH FARM

BACKGROUND

This disclosure relates to aquaculture technologies.

Aquaculture includes controlled aquatic conditions for the farming of aquatic organisms such as fish. Aquatic conditions may be controlled by containing the aquatic organisms or by control of the water in which they are farmed. A typical saltwater fish farm includes a net-pen or a fixed cage containing saltwater fish at an ocean location, where water from the surrounding ocean environment naturally flows through the net-pen or cage to provide fresh oxygenated water to the contained fish and to remove fish and feed waste. A land-based fish farm may include a circular tank of spinning water where centrifugal forces separate effluent from cleaner water. A center drain in the tank typically removes most of the settled waste particles by draining just 10-15% of the effluent, while a side drain at the water surface discharges the remaining effluent from the cleaner water.

Atlantic salmon are commonly farmed using a combination of land-based and open ocean farms. In their early life stages, salmon are freshwater animals know as fry or fingerlings that are grown in freshwater tanks. The fry become saltwater animals known as smolts during their smoltification stage and at a weight of 40-50 grams for Atlantic salmon. This strain of salmon is then transferred to a saltwater farm, which is typically an ocean net-pen at a location with water temperatures that promote adult salmon growth, until harvested at around 4.5 kilograms per fish.

Many factors may affect the productivity, efficiency, and efficacy of a fish farm. Fish farm productivity may be measured by the amount of fish harvested, such as by weight or in the length of time needed for a fish to achieve a weight or other growth milestones. Fish farm efficiency is the amount of resources, such as power, feed, time, or water needed to grow a certain amount of fish. Some factors affecting productivity and efficiency include water temperature, genetics, waste treatment, type of feed used, water cleanliness inside the containment, and lack of diseases at the farm. For example, a preferred water temperature range in the fish containment may encourage faster fish growth leading to higher productivity. Salmon are healthiest and grow fastest in a water temperature range of 7 to 13 degrees Centigrade; above or below that range is not optimal.

The inventors perceive a need for improvements in fish farming technologies, including improvements in productivity and efficiency.

DETAILED DESCRIPTION

This disclosure describes efficient fish farming techniques, including a land-based saltwater flow-through pool fed by seawater intakes, and efficient water flow and waste removal techniques that promote good fish growing conditions. Embodiments include techniques for encouraging laminar flow in a flow-through pool, such as a fish raceway. Laminar flow may provide efficient water flow through the fish farm and may provide efficient waste removal techniques by controlling movement through the pool of waste such as fish excrement and uneaten feed. Reduced turbulence may reduce energy needed to pump water through a pool. Laminar flow may more effectively and reliably deliver oxygen to fish in the pool as compared to a more turbulent flow or flow with eddies or water mixing in a direction perpendicular to the direction of flow. Laminar water flow may move waste, such as uneaten feed and fish excrement, more predictably through the pool and into waste collection systems, such that waste may be concentrated into a first portion of water removed from the tail-end of the pool, while a second portion removed at the tail-end of the pool may have less waste. The second portion of water may then be returned to an open water source, such as the ocean, with minimal filtering or treatment. Thus, the amount of required filtering and treatment for waste may be reduced as compared to prior techniques by reducing the proportion of effluent needing treatment. In some embodiments, the first portion may drain from the near the top and bottom of the pool, while the second portion may drain from a middle depth of the pool. Laminar flow may also waste from reaching the headend of a flow-through pool, preventing bacteria growth or other types of contamination around headend structures.

Structures that may encourage laminar flow of seawater or fresh water through a flow-through pool include a dish positioned in front of a seawater inlet at the headend of the raceway, for example with concave or a parabolic surface facing the inlet, for redirecting current flow outward away from the inlet along the headend wall, a frame wall surrounding the inlet for redirecting current flow inward back toward the inlet, and a pressure filter for creating an antechamber at the headend of the raceway. In embodiments with multiple seawater inlets at the raceway headend, the frame wall may divide the headend wall into sections.

Other embodiments include multiple seawater intakes positioned at different depths in the ocean where, for example, a first intake may be positioned to receive water from an ocean current with a water temperature favorable to a breed of fish in a fish farm and a second intake may be positioned at depth that precludes intake of water contaminated with certain parasites. Seawater from different depths may be different temperatures, and mixing the different temperatures may provide improved growth conditions for fish in a flow-through pool.

Some embodiments may reduce parasite infestation. Traditional saltwater fish farms such as a purse seine-like net-pen in open water allows free flow of water into and out of the net-pen. This may allow some removal of farm waste from the net-pen with a minimum of effort, but there can be many problems with such as system. Frequent disease outbreaks, infestation by parasites such as sealice, and other environmental issues may be common for such open ocean flow-through pens. In addition, farm waste may collect on the ocean floor underneath the pen, which may then create bad environmental effects such as H2S gasses. Techniques disclosed herein mitigate many of these problems.

Embodiments include methods for growing aquatic organisms such as fish, including creating or inducing a laminar flow or substantially laminar flow of fluid through a flow-through pool, such as by using one of more of the various laminar-flow inducing devices and structures described herein. These embodiments may include raising aquatic organisms in the laminar flow of the pool, and may include using the laminar flow to remove waste from the pool. Some embodiments may include preventing contamination by waste and feed of an antechamber at the headend of the pool. Such an antechamber may be created by a pressure filter at the headend of the pool, upstream from where feed is introduced to laminar flow.

Figure 1:
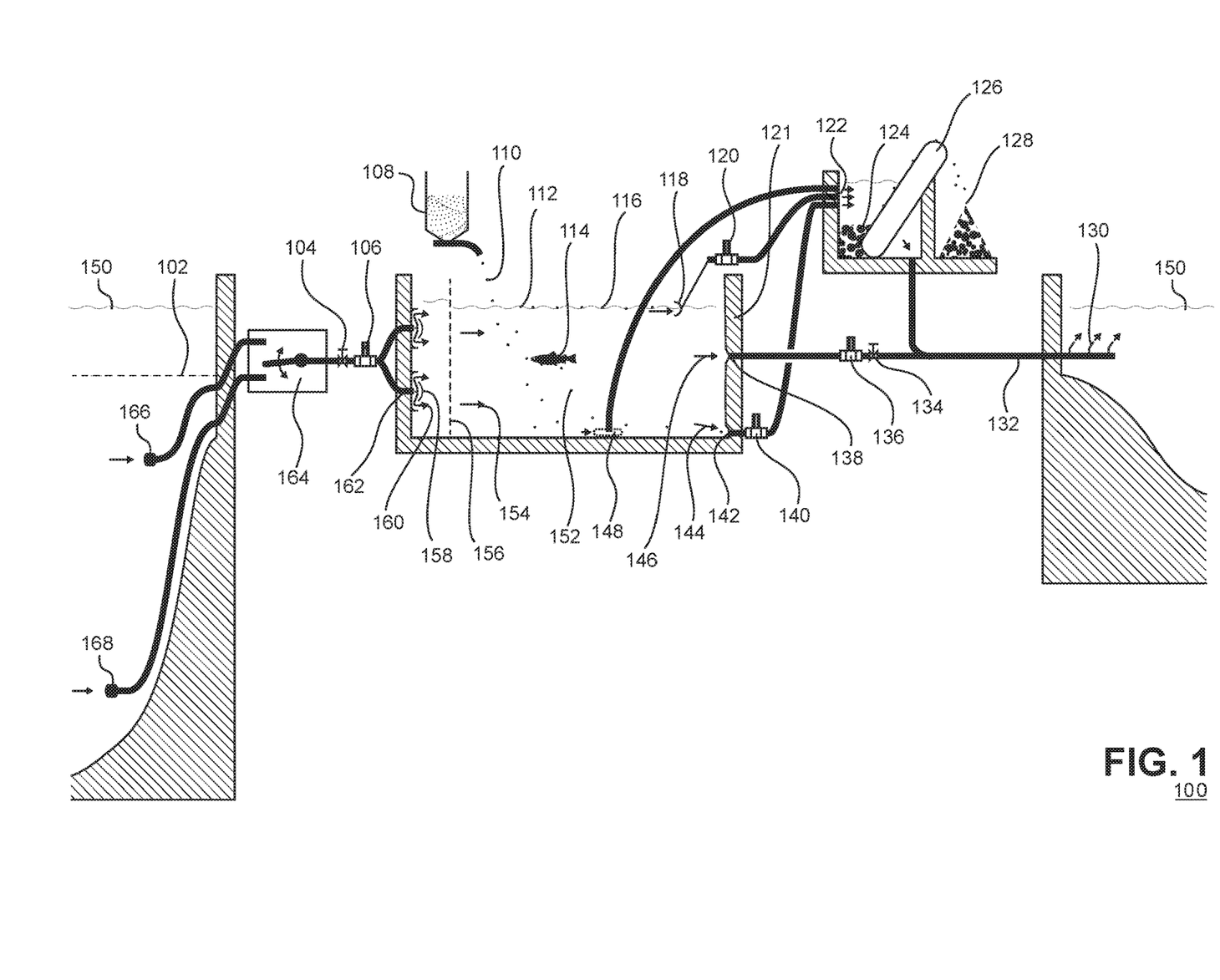
FIG. 1 depicts an overview of an example of a seawater aquaculture system.

FIG. 1 depicts an overview of an example of a seawater aquaculture system 100. A flow-through pool is a type of land-based fish farm. Saltwater fish may be grown on land in an inland flow-through pool fed by sea water which is then drained back to the sea. In FIG. 1, seawater may generally flow from left to right. Seawater intakes 166 and 168 may be positioned at different depths and below a depth 102 in ocean 150. Intakes 166 and 168 may feed a seawater mixer 164, whose output may be controlled by a valve 104 and pump 106 to provide seawater to inlets 162 at the headend of flow-through pool 152. Dishes 158 may be positioned in front of inlets 162 to redirect flow 160 from inlets 162. Pressure filter 156 may define an antechamber at the headend of pool 152 and separate fish 114 from inlets 162. Feeder 108 may drop feed 110 into pool 152. Seawater may flow 154 through pool 152 from the headend (on the left of FIG. 1) to the tail-end (on the right of FIG. 1).

The surface height 112 of water in the pool 152 may substantially match the surface height of ocean 150. Head pressure behind pressure filter 156 built from pump 106 may cause the water surface height in the antechamber, before the pressure filter at the headend of the pool 152, to rise slightly above the surface height on the other side (downstream side) of pressure filter 156. In some embodiments, the pool surface level 112 may rise and fall with the tides of ocean 150. For example, a pool depth from the bottom of the pool to the pool surface level 112 may be 20 meters, while tides rise and fall 1.5 meters on average.

Pool 152 may be rectangular in shape. As compared to prior raceway systems, a flow though-pool may have different proportions. For example, an embodiment of this disclosure may be deeper, shorter from headend-to tail-end, and wider from side to side as compared to prior raceways systems. Additionally, flow speed of fluid in the pool may be slower than raceway system. Such differences may be enabled by the laminar flow to eliminate problems such as waste removal in prior raceway systems. Some differences, such as slower speed fluid, may enable inland growth of fish that typically are raised in open water pens, such as adult salmon, which are not accustomed to the high currents of prior raceways.

The amount of water flowing through the pool 152 can be substantial. Dimensions of many pool elements, such as the inlet, parabolic dish, and distance of the parabolic dish and filter from the headend wall, may all be based on how a required flow rate of water. The required flow rate of water may be based on the amount and type of fish in the pool. Salmon, for example, may require 0.3 liters per minute of water to flow though the pool for every fish in the pool. In one example, a pool 152 may be 20 meters deep from water surface 112 to floor, 40 meters wide, and 50 meters long from headend to tail-end, with the entire volume of water continuously replaced every 30 minutes. To provide that much water at the headend, a flow-through pool may have a pair of inlets 162, with each inlet being a circular opening 2 meters in diameter. The dish 158 may have a parabolic concave surface or may be paraboloid in shape, and may be 3 to 4 meters wide in diameter from edge to edge, and resistance filter 156 may be 3 meters from the headend wall of the pool. Filtering or otherwise treating such a volume of water may be challenging and expensive. Waste treatment efficiency can be improved by dividing the pool outflow into a cleaner portion requiring less treatment filtering, and a dirtier portion requiring more treatment or filtering. Embodiments of the aquaculture system 100 may require only 10% to 20% of the total pool outflow to be filtered via settling tank 121.

A first portion 144 of the pool water may be collected at drain 142 positioned toward the bottom of the tail-end of pool 152 and fed through a pump 140 to settling tank 121 or another type of waste treatment or removal system. Settled waste 124 may be collected in settling tank 121 and be removed by filter 126 to create cleaner water. Cleaned water may be drained by outlet 132 from settling tank 121 and returned to ocean 150 via outlet diffuser 130. Collected waste 128 may be dried and used as fertilizer for crops or burned to create energy.

A second portion 146 of pool water may be collected via drain 138 to be returned to ocean 150 via outlet 132 without passing through a settling tank or otherwise cleaned or treated. In some situations, a pump 136 and or valve 134 may be used to control effluent from the second portion 146 of water.

In some embodiments, additional pool waste may be collected by cleaning robot 148 and floating skimmer 118. Cleaning robot 148 may remove waste settled on the bottom of the pool 152, for example by moving around the bottom of the pool 152. A pump (not depicted) may suck water from mobile or robotic suction head on the bottom of the pool to capture waste near the bottom or settled on the floor of the pool. Floating skimmer 118 may float to collect floating waste and move up and down as water level 116 in the pool moves up and down, such as with the tides of ocean 150. Pump 120 may suck water and waste into floating skimmer for treatment, such as in setting tank 121.

Figure 2:
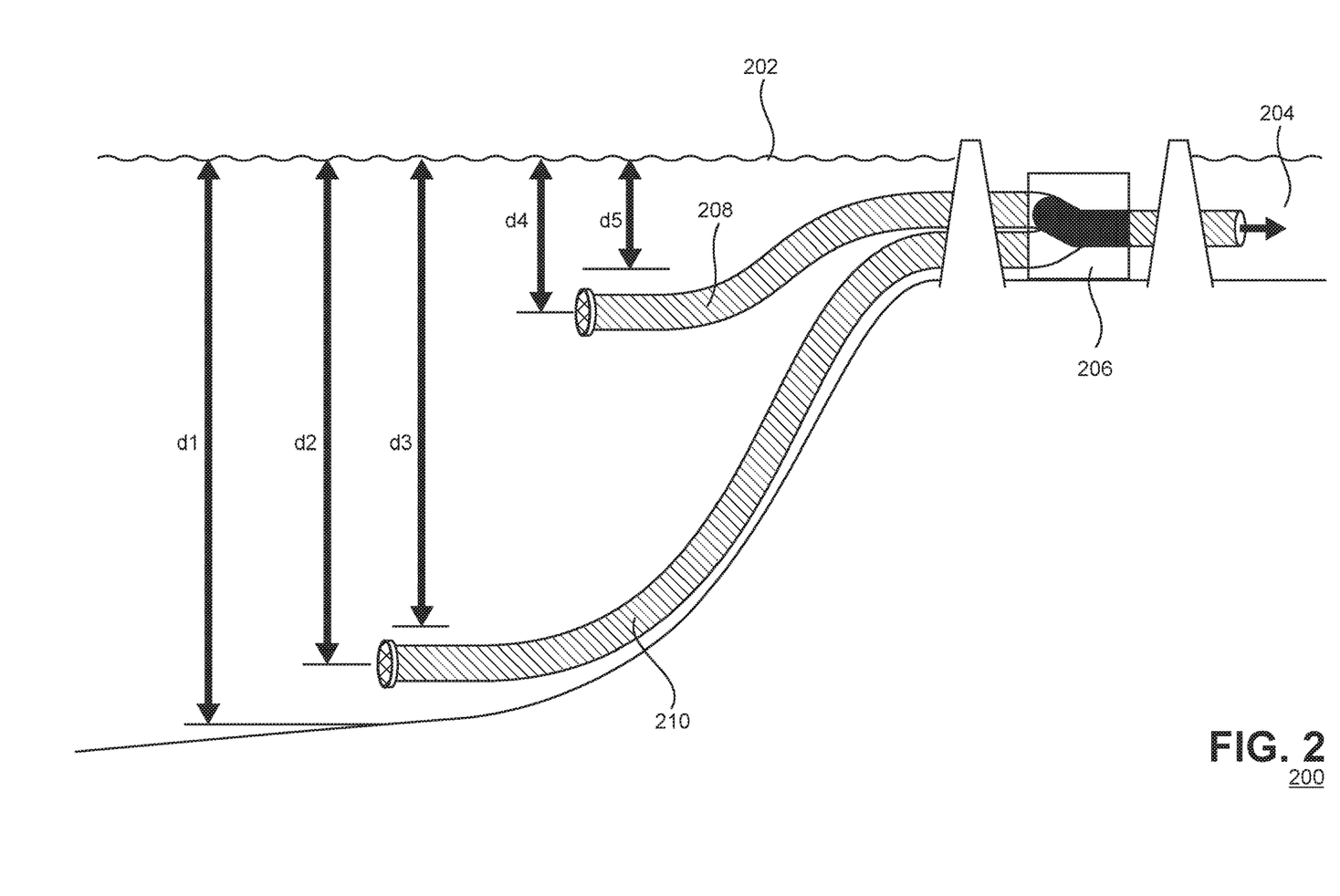
FIG. 2 depicts an example of a sea water intake system.

FIG. 2 depicts an example of a sea water intake system 200. Intakes 208 and 210 receive seawater from the ocean. Intake control 206 controls the proportion of water from intakes 208 and 210 that are used to supply seawater to a land-based fish farm via pipe 204. Intake 210 may be a pipe with an opening at a depth d2 below the average sea level surface, where depth d2 is between depths d1 and d3. Intake 208 may be a pipe with an opening at depth d4 below the water surface, where depth d4 falls below depth d1 and above depth d2. Intake control 206 may control mixing of the intakes via a variable mixer (not depicted). By varying the proportion of ocean water sourced between intakes 208 and 210, intake control 206 may vary the proportion of water from ocean depths d2 and d4 that enter an intake channel for a land-based fish farm via pipe 204. In this way the temperature and other seawater properties output feed into the pool may be the result of such a mixture. In other embodiments, intake control may simply select between intake 208 and 210.

Desirable properties of ocean water, including desirable temperatures, may vary with depth in an ocean. A large-scale ocean current, such as caused by thermohaline circulation and including meridional currents, may move warmer water from near the equator toward the earth's poles, and may move cold water at the poles toward the equator. For example, temperate water may move north-east in the Gulf Stream ocean current (from the Gulf of Mexico up to the North Atlantic) in combination with the North Atlantic Drift ocean current (eastward across the North Atlantic) and the Norwegian ocean current (from the North Atlantic Drift up the coast of Norway to above the Arctic Circle).

Depths d1 and d3 may define a range of depths within which an ocean current flows having properties desirable for a fish farm. Between the depths of d1 and d3, water from southern oceans may be delivered to northern latitudes at certain times of the year. For example, the Gulf Stream ocean current may reach parts of the Norwegian coast at a depth below 120 meters, where the Gulf Stream may have water temperatures between 6 and 8 degrees Celsius even in winter with a stable salinity of 3.3-3.4% and a surface temperature of 1-2 degrees Celsius. Water properties such as these may be desirable for a fish farm. Generally warmer water temperatures up to 13 degrees Centigrade may promote faster or better fish growth, leading to higher fish farm productivity.

A fish farm may obtain saltwater primarily from intake 210 in the summer, and then primarily from intake 210 in the winter, to promote fish farm productivity in all seasons. During the summer, water closer to the surface may have temperatures higher than temperatures in the ocean current. For example, summer ocean surface temperatures on parts of the Norwegian Arctic coast may reach 12 to 13 degrees Celsius. However, water close to the ocean surface may have other undesirable properties, such as presence of organisms or pollutants that might infest or otherwise adversely affect fish in a fish farm. Depth d5 may be a depth below which seawater does not have an undesirable property. For example, sealice, which are a regulated pest for salmon farms, may not occupy sea water at depths below 25 meters below the ocean surface. Hence, by accepting water below depth 25 meters, intakes 208 and 210 may receive only water that is free of sealice.

Figure 3A:
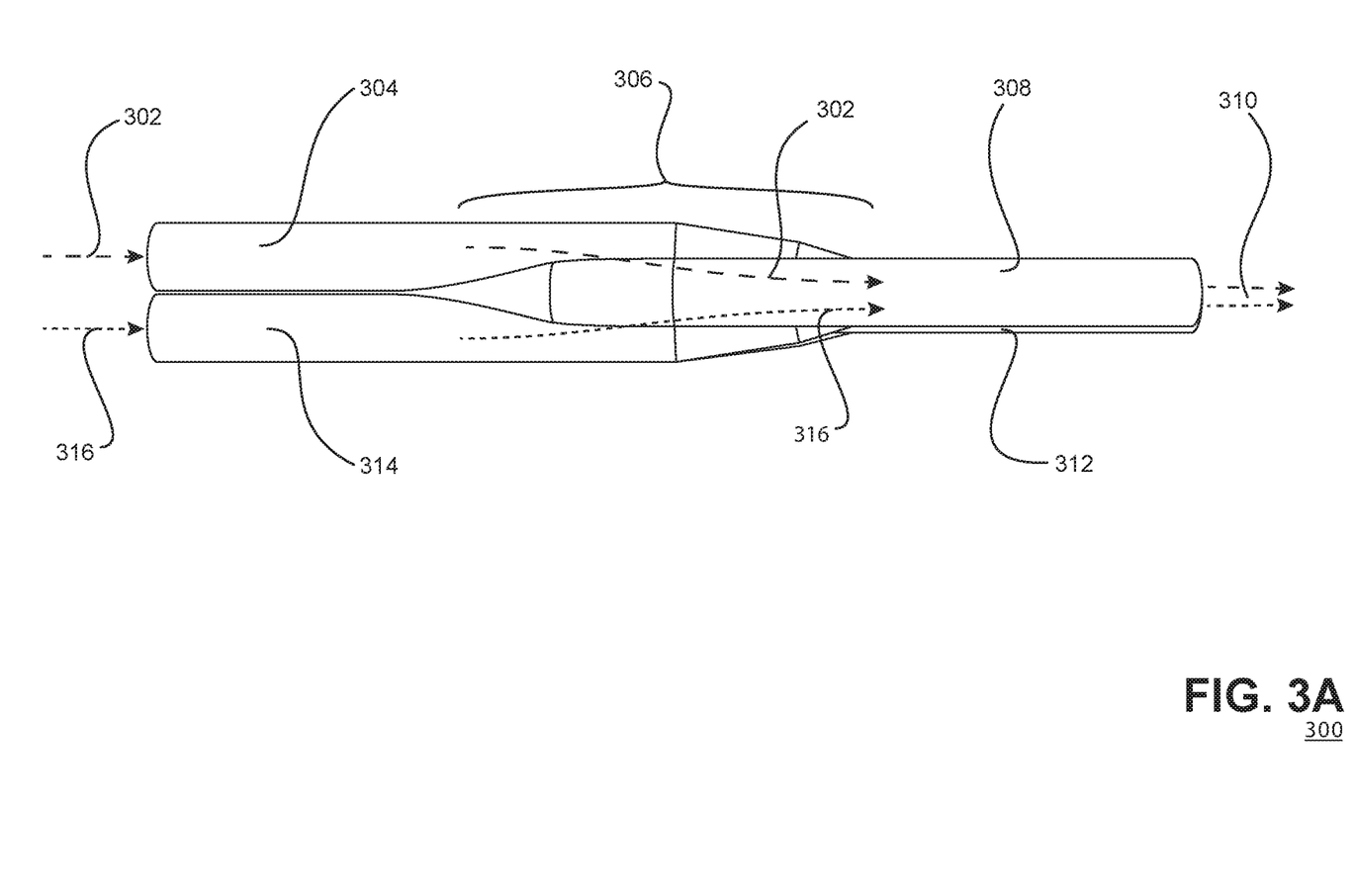
FIG. 3A depicts a top-down view of a seawater mixing system.
Figure 3B:
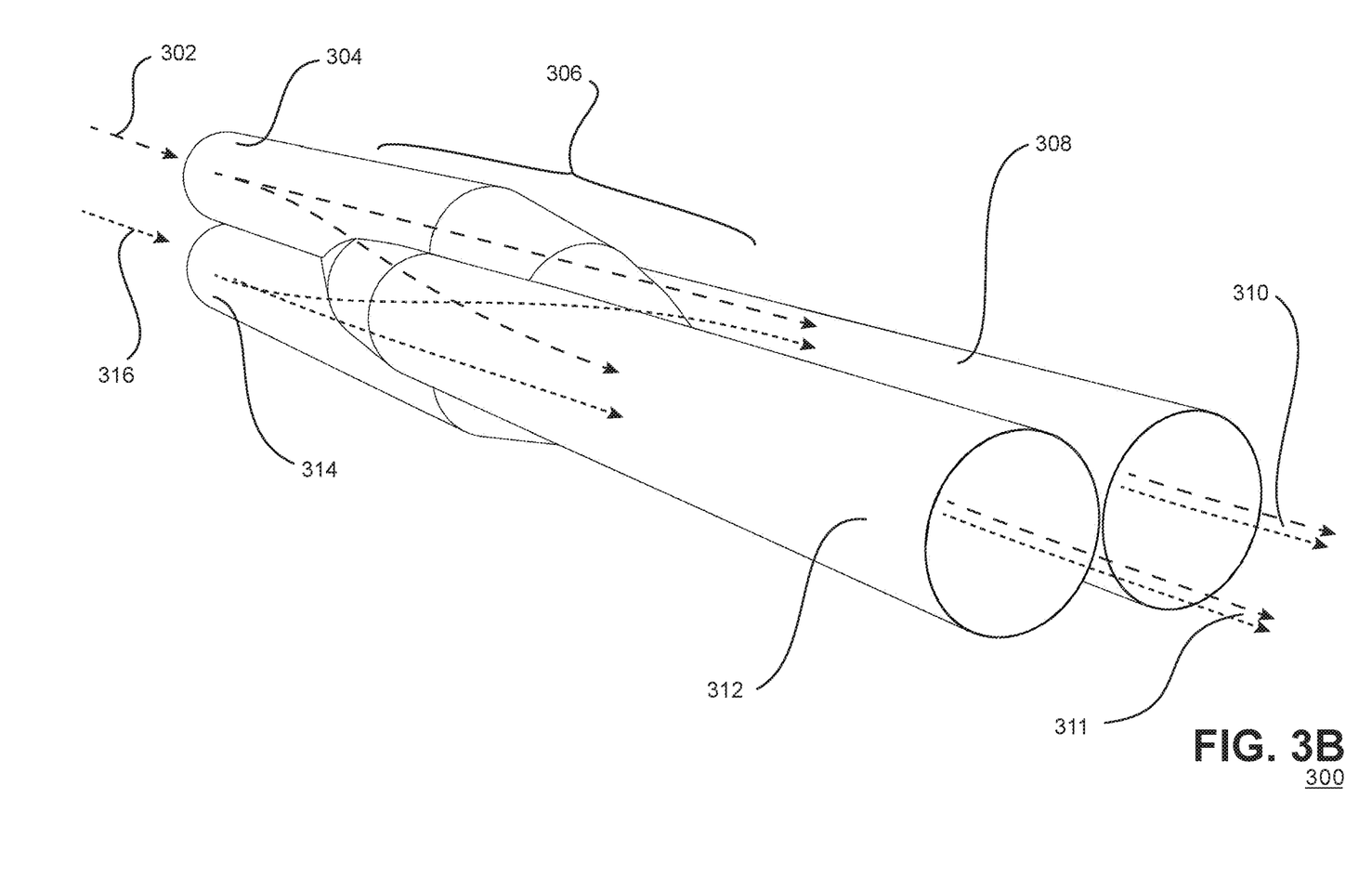
FIG. 3B depicts a perspective view of the seawater mixing system of FIG. 3A.

FIG. 3A-3D depict different view of a seawater mixing system 300. FIG. 3A depicts a top-down view of the mixing system 300. Mixing system 300 includes a first inlet pipe 304 and second inlet pipe 314, which are connected to the input side of mixing pipe 306. The output side of mixing pipe 306 is connected to a first outlet pipe 312 and a second outlet pipe 308. Mixing system 300 may be used, for example, to mix water from two seawater intakes as in mixer 164 of FIG. 1 or intake control 206 of FIG. 2. A first fluid 302 may flow in first inlet pipe 304, and a second fluid 316 may flow separately through separate second pipe 314. Inside the mixing pipe 306 first fluid 302 and second fluid 316 may be merged to create mixture of fluids 302 and 316 that flows though both outlet pipes 308 and 312. As can be seen from in the perspective view of FIG. 3B, after entering mixer 306 from pipe 304, fluid 302 is split into two portions as it is mixed with fluid 316, the separate portions exiting via different outlet pipes 308 and 312. The second fluid is similarly split in the mixer, with the result being output fluids 310 and 311 in pipes 308 and 312, respectively. Each output fluid 310 and 311 includes a portion of both fluids 302 and 316. As shown in FIG. 3B, inlet pipes 304 and 314 are stacked vertically side-by-side, while outlet pipes 308 and 312 are arranged horizontally side-by-side.

Figure 3C:
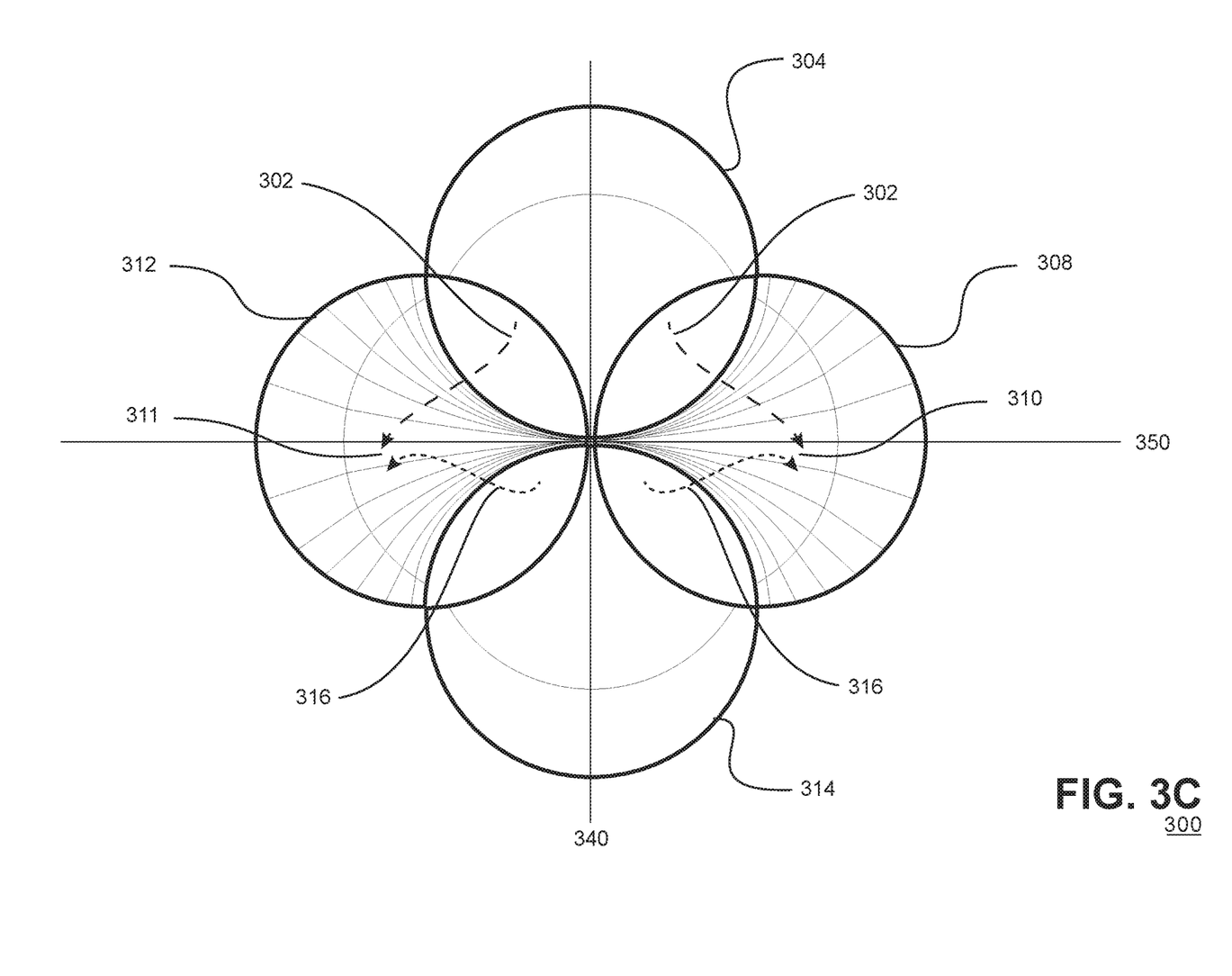
FIG. 3C depicts an end view of the seawater mixing system of FIG. 3A.
Figure 3D:
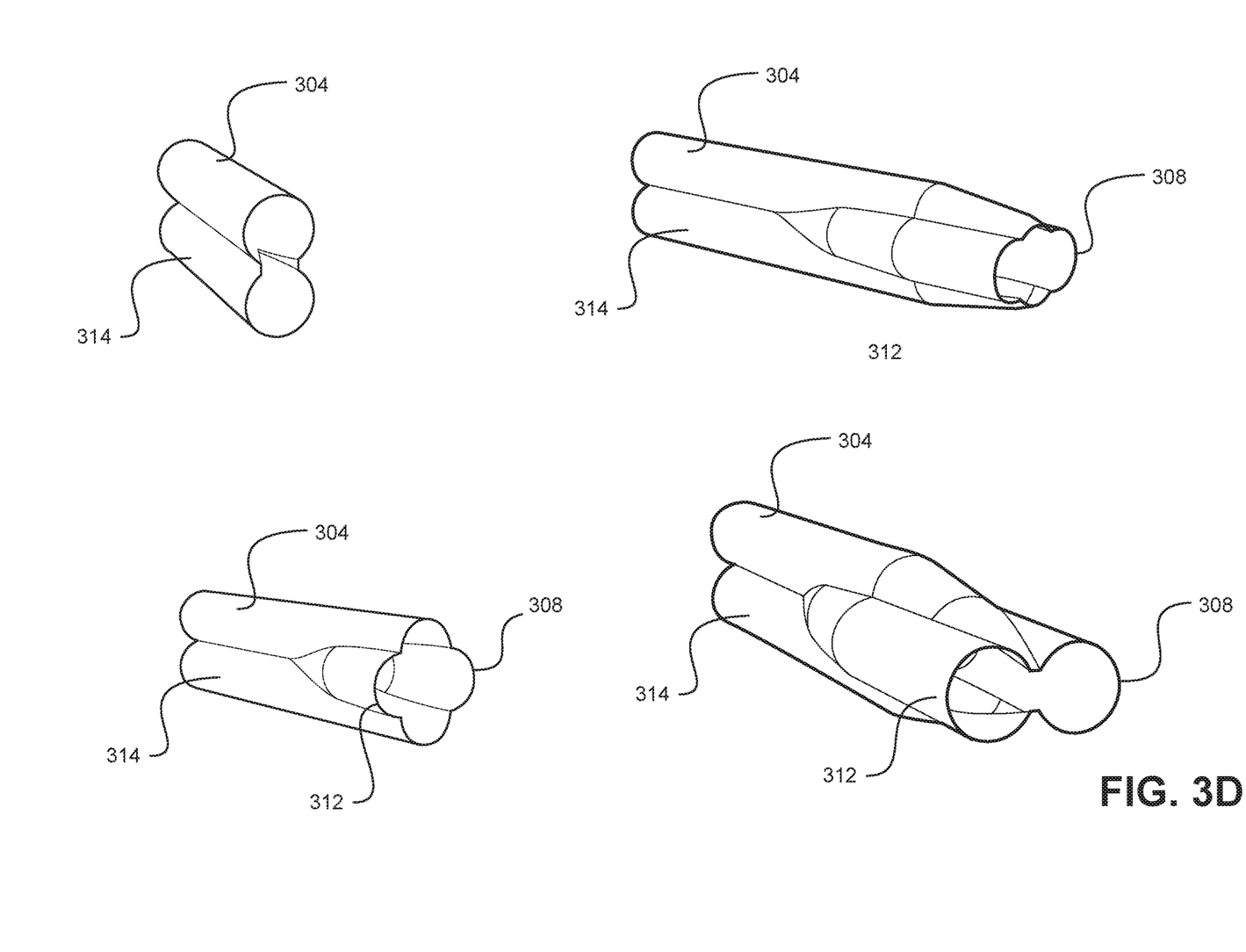
FIG. 3D depicts four cut-away views of the mixing system of FIG. 3A

FIG. 3C depicts an end view of the seawater mixing system 300 of FIG. 3A. This view looks into the open ends of outlet pipes 308 and 312, while the exterior of inlet pipes 304 and 314 are depicted as the inlet pipes bend toward the center of mixer 306. Contour lines inside outlet pipes 308 and 312 indicate the curve of the interior of these pipes toward the center of mixer 306. The inlet pipes 304 and 314 are arranged along axis 340, while outlet pipes 308 and 312 are arranged along axis 350, which is perpendicular to axis 340. FIG. 3D depicts four cut-away views of the mixing system of FIG. 3A.

Figure 4:
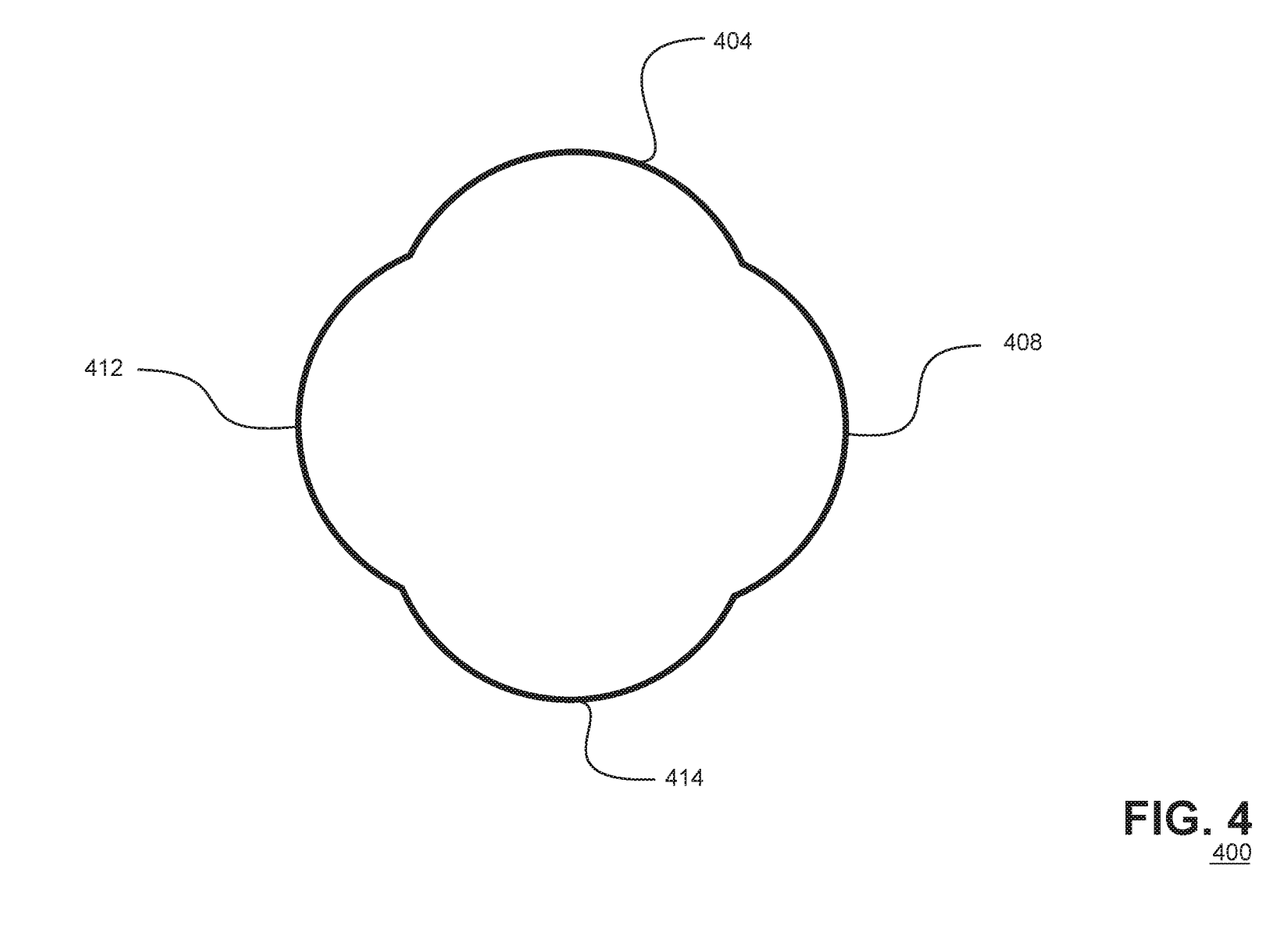
FIG. 4 depicts a cross section of a seawater mixing system of FIG. 3A.

FIG. 4 depicts a cross section 400 through at the lengthwise center of mixer 306 of mixing system 300. The center of mixer 306 is a clover-leaf shape where vertically arranged inlet pipes 304 and 314 are merged with horizontally arranged outlet pipes 308 and 312. As depicted, there are no interior veins or walls inside mixer 306 at its center. This mixer arrangement allows fluids 302 and 316 to mix in a controlled manner, very efficiently, and with little turbulence.

Figure 5:
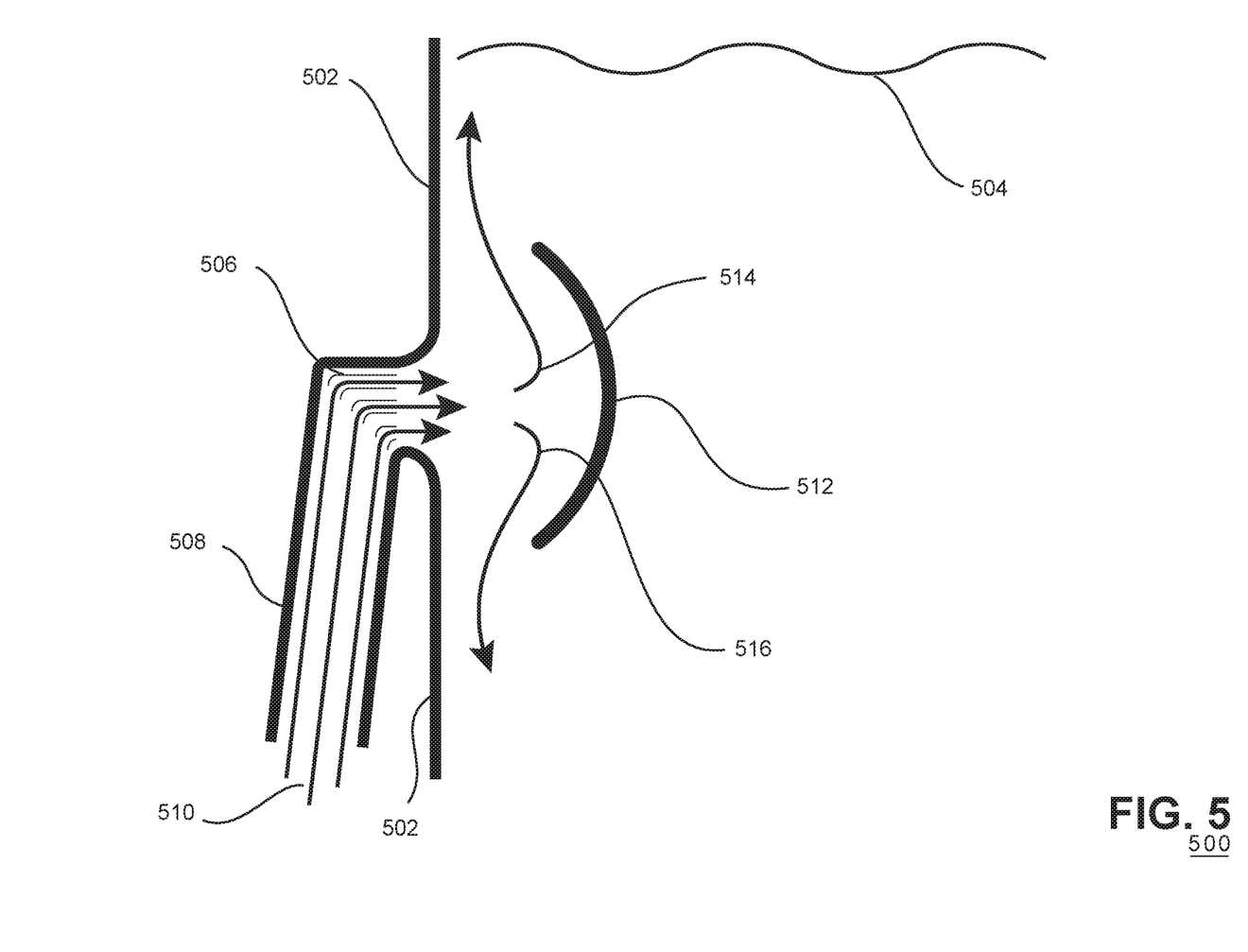
FIG. 5 depicts an example flow shaping structure with a dish.

FIG. 5 depicts an example flow shaping structure 500 with a dish. Flow-through pool 504 is fed by water flow 510 through inlet pipe 508. Dish 512 is positioned in front of inlet into headend wall 502 from pipe 508. Dish 512 may be curved, starting from a center point farthest from the inlet and the pool headend wall 502, back toward the headend wall 502. The dish 512 may be a parabolic in shape (or a paraboloid in three dimensions), may be a section of a sphere, or other similar three-dimensional shape. Dish 512 may cause flow 510, as it exits pipe 508, to be redirected radially away from the inlet along the headend wall 502, for example along flows 514 and 516.

Veins 506 at a bend in pipe 508 may reduce resistance to fluid flow around the bend in the pipe. If an inlet pipe is bent just before an opening to a flow-through pool, veins may be positioned in the inlet pipe just at the inlet opening into the pool.

Figure 6:
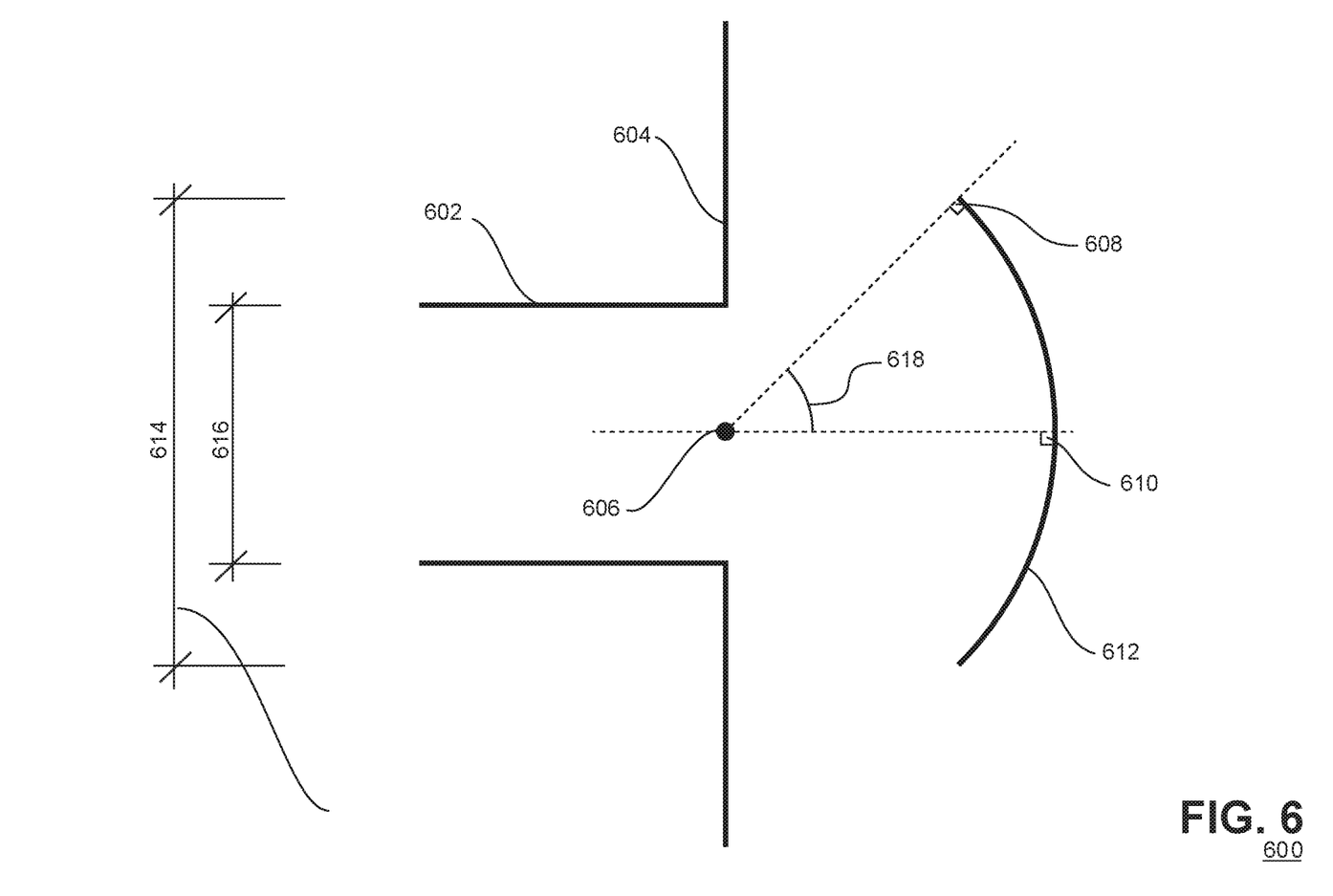
FIG. 6 depicts an example schematic of a flow shaping structure.

FIG. 6 depicts an example schematic of a flow shaping structure 600. Pipe 602 meets a pool wall 606 at an inlet centered on point 606. Dish 612 may be centered on the inlet in that center point 610 of dish 612 may be directly in front of the center point 606 of the inlet. A width 616 of the inlet may be smaller than the width of dish 612. The angle 618 from the center point 606 of the inlet and between the edge 608 of the dish and the center point 610 of the dish may be, for example, 45 degrees. The distance from edge point 608 to the plane of wall 604 may be less than half the distance to the from center point 610 to the plane of wall 604.

Figure 7:
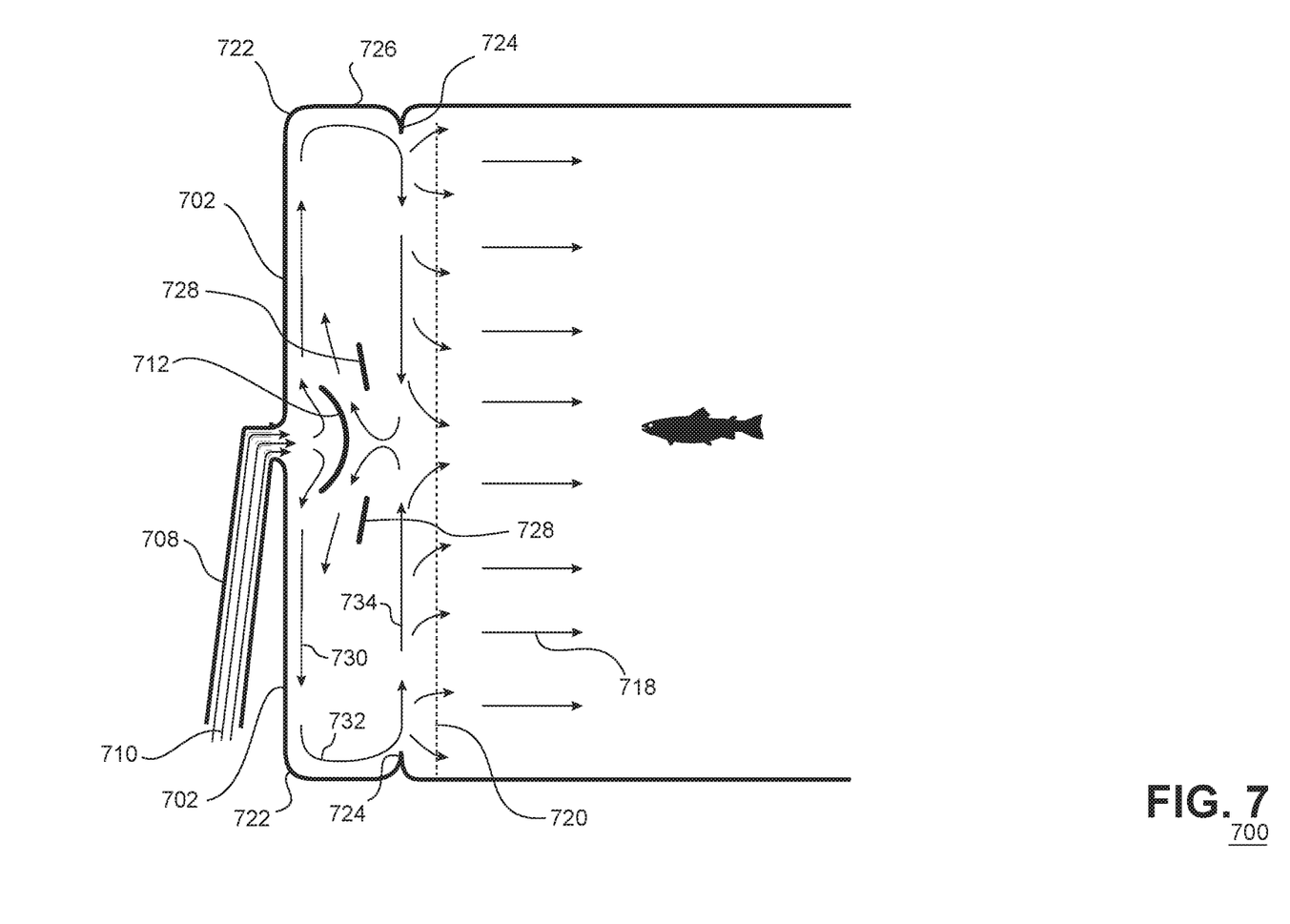
FIG. 7 depicts an example flow shaping structure with a frame.

FIG. 7 depicts an example top-down view of a flow shaping structure 700 with a frame. Pipe 708 feeds water flow 710 through an inlet in the headend wall 702 of a flow-through aquaculture pool. Flow-shaping devices in the pool of structure 700 may include dish 712, frame wall 726 with rounded corners 722 and 724, and pressure filter 720. Optional spoiler 728 may or may not be included in some embodiments.

Water may enter the pool as flow 710 into the inlet, and may be diverted by dish 712 into an outward flow 732 that flows along the headend wall 702 and radially outward from the inlet and perpendicular to the length of the pool. Flow 732 may then reflect off frame wall 726 and corners 722 and 724 as flow 732, which then may become an inward flow 734. As flows 732 and 734 pass alone pressure filter 720, the flows may be diverted to exit the headend antechamber defined by pressure filter 720 by passing through pressure filter 720 to become flow 718 that flows along the length of the pool. Flow 718 may nourish fish in the pool, and be drained from the tail-end of the pool.

The inlet in wall 702 of pipe 710 may be, for example in the shape of a circle or a square in the headend wall 702. Dish 712 and optional spoiler 728 may surround the inlet with circular symmetry, while wall 726 may surround the inlet in the shape of a rectangle or square. Similarly, pressure filter 720 may be square or rectangular, spanning the space from one side wall of a pool to another side wall of a pool. In other embodiments, a plurality of inlets in a headend wall may have dishes and frames around each inlet, with the plurality of inlets, dish and frames all behind a single pressure filter.

Rear corner 722 and forward corner 724 may be curved with fillets to shape flow 732. Dish 712 may be positioned between rear corner 722 and forward corner 724, and pressure filter 720 may be further down the pool, past corner 724.

Optional spoiler 728 may tend to encourage part of flow 734 toward pressure filter 720, and may additional tend to encourage the remainder of flow 734 back between the spoiler and the dish to join flow 732.

The combinations of the flow shaping devices in structure 700 at the headend of a flow-through pool may tend to create a more uniform distribution of current 718 across a pool, may reduce turbulence in water as it moves down the pool, and hence these structures may encourage laminar flow past the fish in the pool. A more laminar flow may have several benefits, including: better controlled movement of waste, such as fish excrement and feed, through a pool making waste removal more efficient; reduced turbulence, which may result in a more efficient flow requiring less energy or pressure to create the flow of fluid from headend to tail-end of the pool; and a lack of turbulence near the output of the pressure filter 720, which may prevent waste from moving back past the pressure filter and into the antechamber at the headend, thereby reducing bacterial growth and other related problems of waste in the antechamber. These devices may encourage laminar flow in both freshwater and seawater flow-through systems.

Figure 8A:
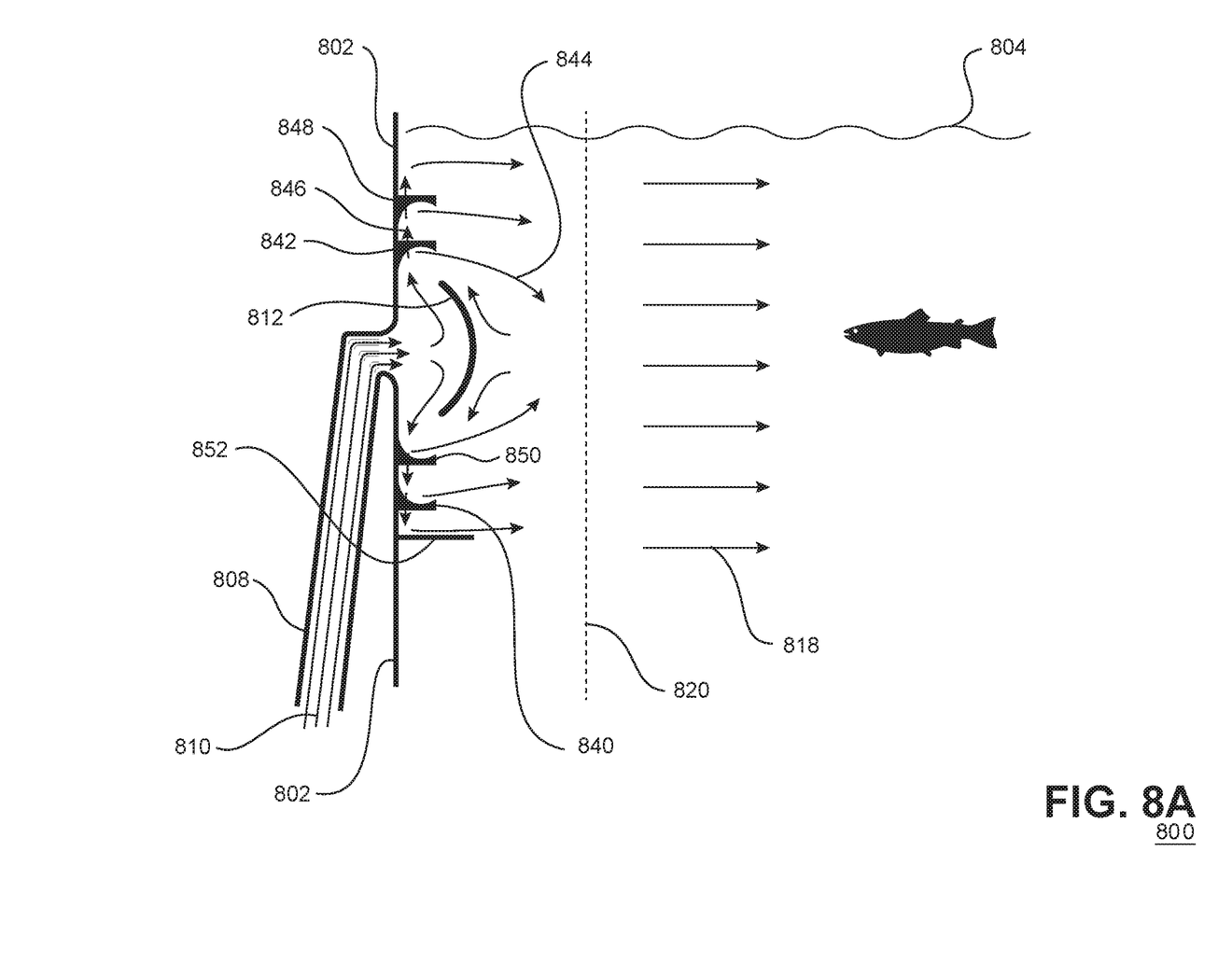
FIG. 8A depicts an example flow shaping structure with wall-mounted spoilers.

FIG. 8A depicts an example side view of shaping structure 800 with wall-mounted spoilers. Pipe 808 feeds water flow 810 through an inlet in the headend wall 802 of fish pool. Flow-shaping devices in the pool of structure 800 may include dish 812, section divider 852, and pressure filter 820. Optional spoilers 840, 842, 848, and 850 may or may not be included in some embodiments. Section divider 852 may separate a first upper inlet (depicted as output of pipe 808 into the pool) from additional lower inlets (not depicted) below the first upper inlet and further below the water surface level 804 of the pool.

Figure 8B:
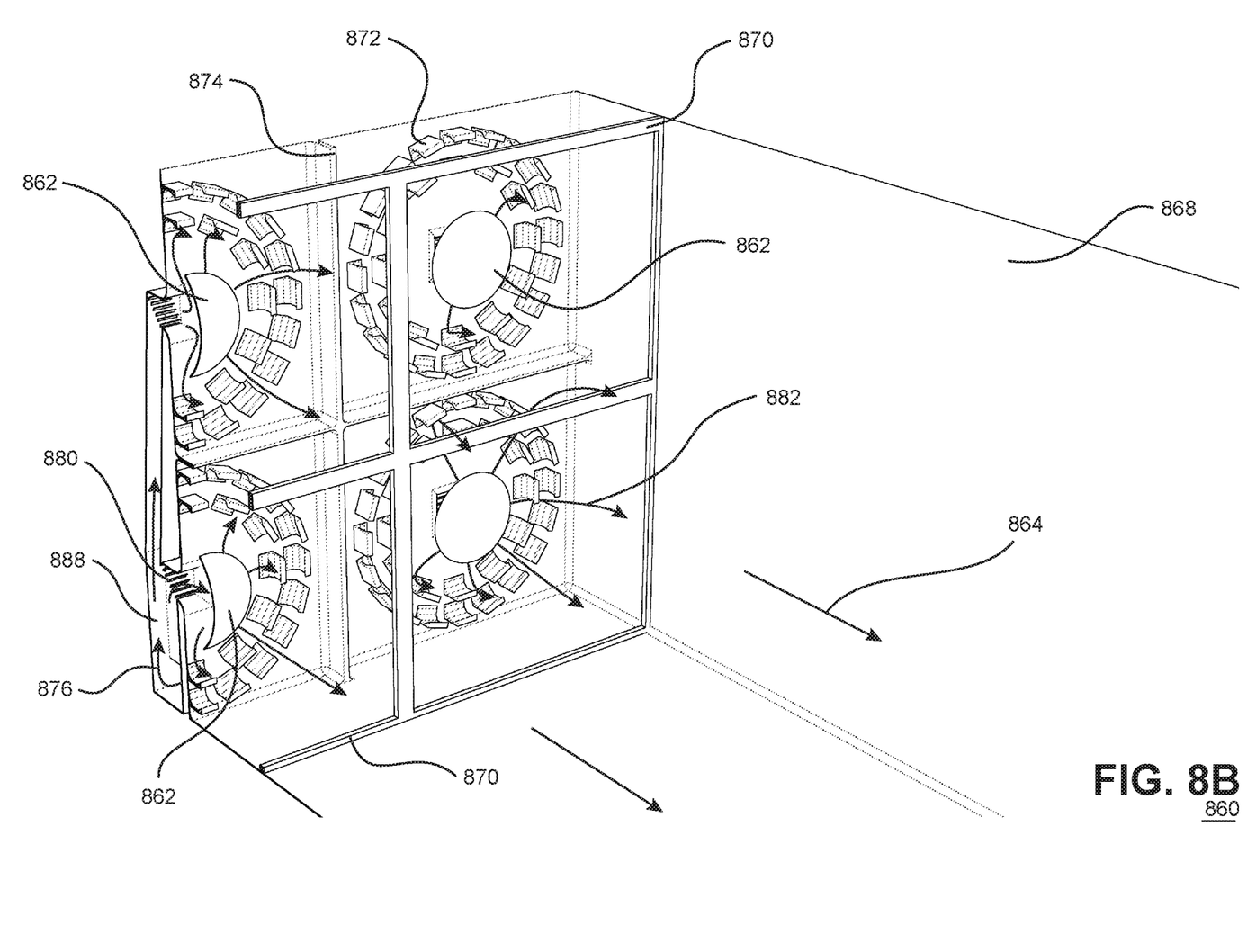
FIG. 8B depicts an example perspective view of flow shaping structure with wall mounted spoilers.

Optional spoilers 840, 842, 848, and 850 may be arrayed in concentric broken circles around the inlet (for example as depicted in FIG. 8B). As in previous figures, dish 812 may redirect flow 810 radially outward from the inlet. Each spoiler, such as 840, 842, 848, and 850, may redirect a portion of the radial outward current toward pressure filter 820. For example, spoiler 842 may redirect a portion of the radial outward current into current 844 heading generally toward pressure filter 820 and down the pool.

FIG. 8B depicts an example perspective view of a flow shaping structure 860 with wall mounted spoilers. FIG. 8B depicts four sections at the headend of a pool in a 2×2 array, each section including a dish 862 in front of a square inlet. Channel 888 divides current 876 to flow past veins into the inlets. For example, current 880 flows through an inlet in the lower left section of the flow-through pool 868. Section divider 874 is a wall extending from headend wall into the antechamber with a length less than the length of the antechamber. Section divider 874 may tend to keep current from the inlets of different sections from mixing and creating turbulence. Spoilers 872 are arrayed radially in broken concentric circles around each inlet. Antechamber frame 870 may hold pressure separate pressure filters for each inlet section.

Figure 9:
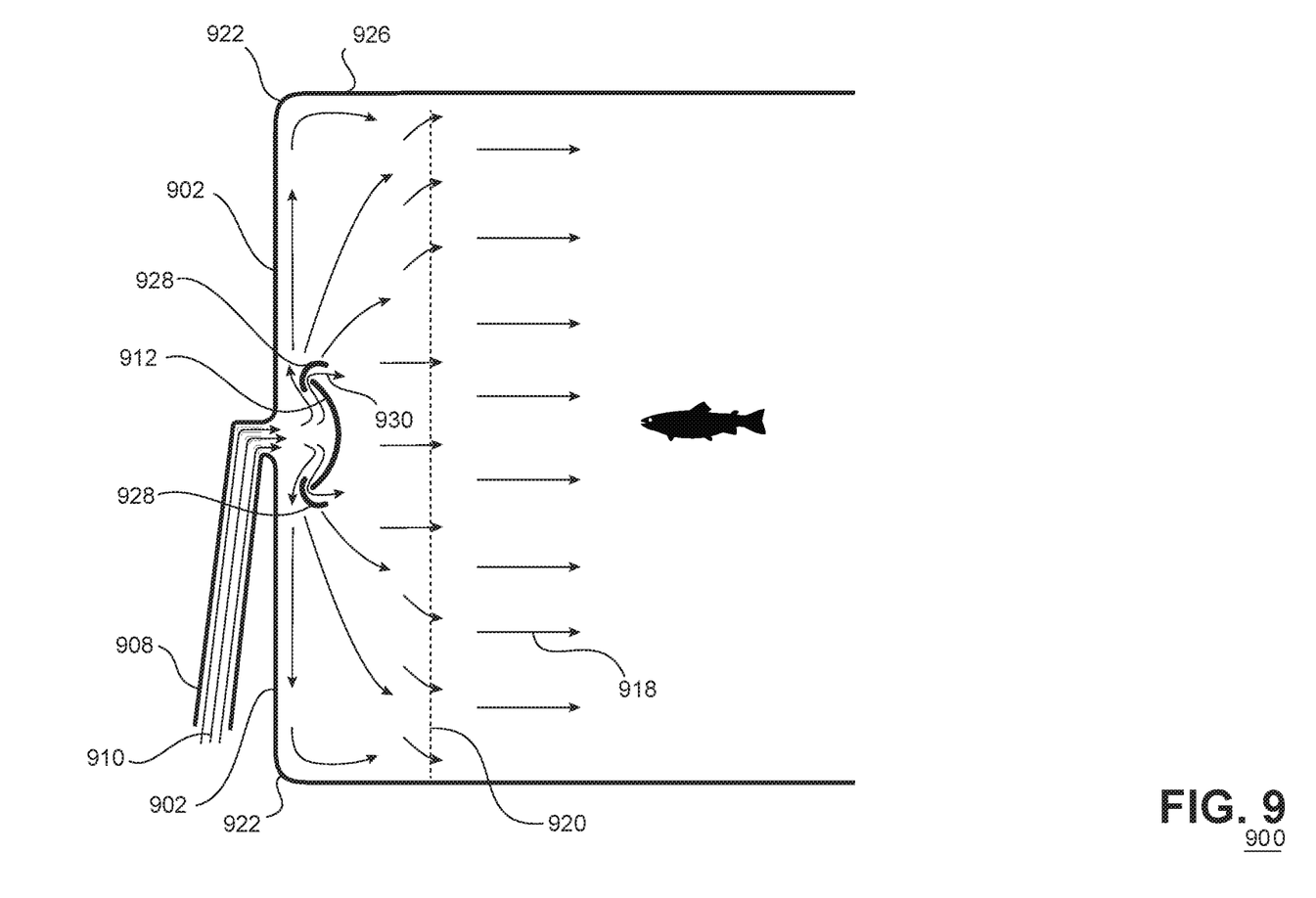
FIG. 9 depicts an example flow shaping structure with spoilers.

FIG. 9 depicts an example side view of flow shaping structure 900 with dish spoilers. Pipe 908 feeds water flow 910 through an inlet in the headend wall 902 of fish pool. Flow-shaping devices in the pool of structure 900 may include dish 912, pool side wall 926, and pressure filter 920. Optional spoilers 928 may or may not be included in some embodiments. Spoiler 928 may be a curved shape proximate to the edge of dish 912 and may redirect some of the water from inside dish 912 as current 930 back toward pressure filter 920 and not radially along the headend wall.

We claim:

1. An aquaculture system comprising:
   an inlet in a headend wall of a flow-through pool for providing a fluid to the pool;
   a dish positioned inside the pool and centered on a center of the inlet for distributing a current from the inlet along the headend wall and the dish is configured to reduce a turbulence in the pool;
   a pressure filter creating an antechamber for the pool at a headend of the pool, wherein the inlet, the dish, and the headend wall are in the antechamber, and the fluid passes through the pressure filter into the pool;
   a frame wall around the inlet extending from the headend wall and along the pool; and
   a return fin inside the antechamber and extending inward toward the inlet from the frame wall between the headend wall and the pressure filter.

2. The system of claim 1, wherein the dish is paraboloid in shape.

3. The system of claim 1, further comprising:
   a first curved fillet at a joint of the headend wall and the frame wall; and
   a second curved fillet at a joint between the frame wall and the return fin.

4. The system of claim 1, further comprising:
   a second inlet in the headend wall; and
   wherein a portion of the frame wall bisects the headend wall between the inlet and the second inlet.

5. The system of claim 1, wherein a wall of the pool or a floor of the pool form a portion of the frame wall.

6. The system of claim 1, wherein the dish is positioned in the antechamber between the inlet and the pressure filter, and further comprising:
   a spoiler positioned in the antechamber between the headend wall and the pressure filter.

* * * * *